United States Patent

Cantor et al.

[15] 3,637,312
[45] Jan. 25, 1972

[54] ROLL ALIGNMENT DETECTOR

[72] Inventors: Clarence Cantor, Alexandria, Va.; Irving B. Lowen, Bowie, Md.

[73] Assignee: The United States of America as represented by the Administrator of the National Aeronautics and Space Administration

[22] Filed: Oct. 31, 1969

[21] Appl. No.: 873,045

[52] U.S. Cl. ................................356/152, 356/138, 250/208
[51] Int. Cl. ................................................................G01b 11/26
[58] Field of Search....................356/1, 141, 152, 150, 151, 356/153, 138; 250/202, 231 SE, 224, 225, 208

[56] References Cited

UNITED STATES PATENTS 3,220,298   11/1965   Powell et al. ...........................356/141
3,393,600   7/1968   Bess........................................356/152

FOREIGN PATENTS OR APPLICATIONS 1,259,951   3/1961   France...................................356/138

Primary Examiner—Rodney D. Bennett, Jr.
Assistant Examiner—Stephen Buczinski
Attorney—R. F. Kempf, N. B. Siegel and G. T. McCoy

[57] ABSTRACT

A method and apparatus for precisely measuring roll misalignment of a test body with respect to a reference body is presented. Two light sources are provided on the test body. The light sources are focused upon a rotating disc. The light images are intercepted by an aperture on the rotating disc to illuminate detectors behind the disc. Measurement of the angular displacements at the times of detector illumination gives a precise indication of roll misalignment of the body under test. Accurate roll misalignment is measured even in the event that the body under test is displaced laterally in addition to angularly about the light of sight. The unique geometry that enables this apparatus to be insensitive to lateral displacements is presented.

12 Claims, 6 Drawing Figures

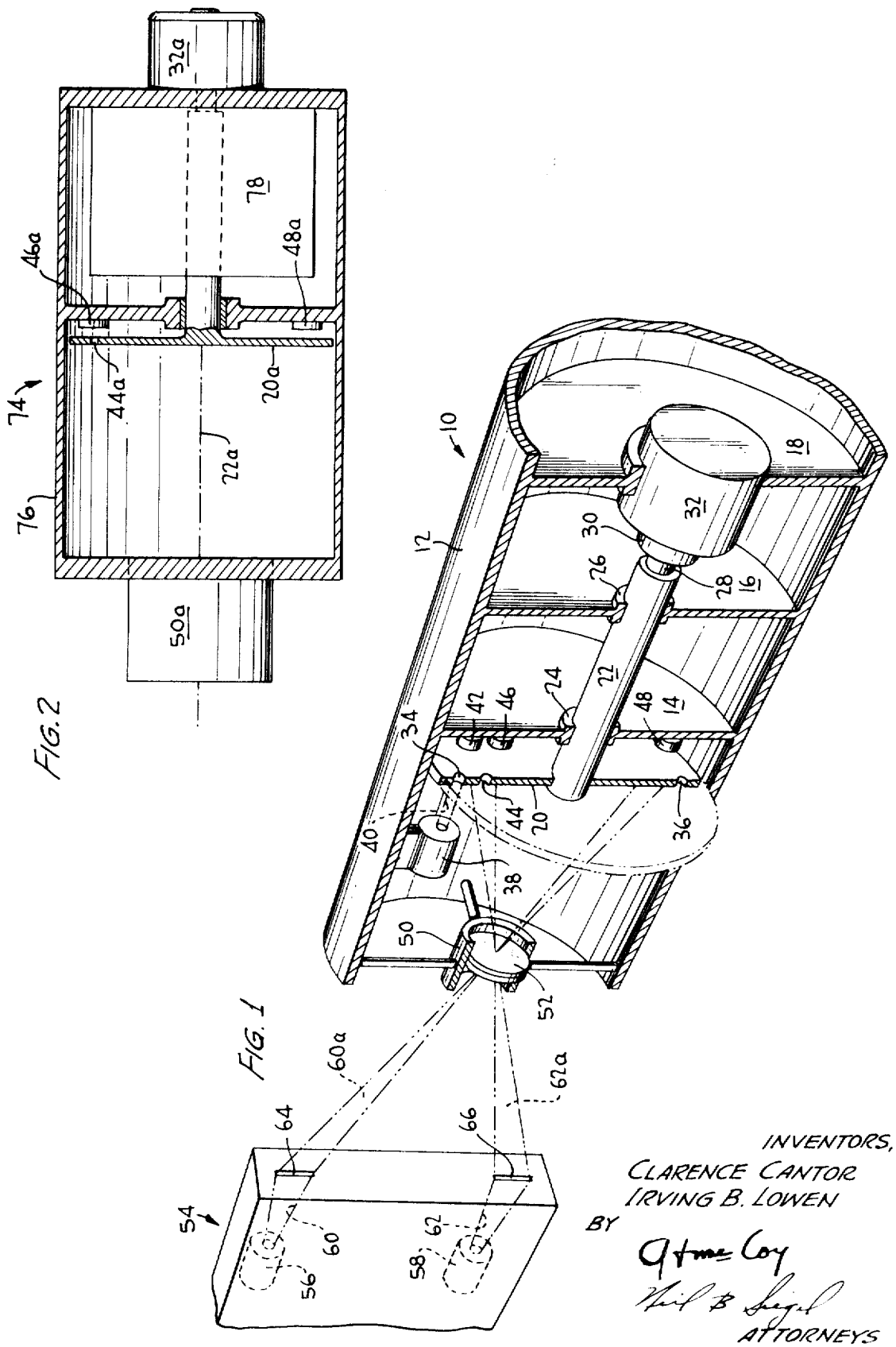

INVENTORS,
CLARENCE CANTOR
IRVING B. LOWEN

BY

ATTORNEYS

ROLL ALIGNMENT DETECTOR

The invention described herein was made by employees of the United States Government and may be manufactured and used by or for the Government for governmental purposes without the payment of any royalties thereon or therefor.

The present invention relates to a roll misalignment detecting apparatus, and, more specifically, to an apparatus for precisely measuring relative angular misalignment of a test body with respect to a reference body about the line of sight between the two bodies.

The apparatus of the present invention is especially suited for accurate measurement of roll misalignment of a spacecraft component with respect to a reference body mounted on the spacecraft. In a typical application, the reference body is oriented so as to point precisely at a target, for example, a lunar, stellar, or solar image. The line of sight established by the reference body is purposely used to provide target alignment of additional spacecraft components, such as cameras and energy detectors. Ordinarily such additional components are mounted in the spacecraft and operably associated with the reference body by an established accurate initial alignment. However, due to distortion in the mounting structure thereof such components often become misaligned during spacecraft launch and flight. Whereas, many prior art devices are available for detecting such misalignment along axes orthogonal to the line of sight, the present invention is directed specifically to heretofor limited detection apparatus for accurately measuring angular misalignment about said line of sight. The misalignment detected by the present invention is either telemetered to a ground station or fed to a controlled servo apparatus for correction of the component orientation.

The present invention requires only that a single reference body be accurately pointed on target. Accordingly, when multiple additional satellite components are required to point precisely at the same target, the present invention permits misalignment detection and measurement for each of such additional components provided in the spacecraft. Further, the invention supplies misalignment information by which precise realignment of each component with respect to the reference body line of sight may be accomplished.

According to the invention, each component of which alignment thereof is to be measured is purposely provided with spaced, illuminated slits which are optically focused to form two line images of 180° separation upon the scanning apparatus. Such scanning apparatus includes a planar disc providing a rotating reference aperture. More specifically, the disc is rotatably mounted orthogonal to the reference body line of sight. If the test body being examined is, in fact, aligned angularly about the line of sight, one of the line images will intercept the aperture when the disc is rotated to a reference position. As the disc is further rotated 180° the other line image will intercept the aperture at the second reference position.

However, if the line images are angularly misaligned from the two reference positions of the rotating disc, such images will intercept the aperture only when the disc is rotatably displaced from its reference positions. The displaced positions of the disc when such interceptions occur are each proportional to the angular misalignment of the test body with respect to the reference body about the line of sight. Photodetectors are provided for detecting such interceptions. The signals from the interceptions are used to activate a readout of either a timer or a shaft encoder. Comparison of readings taken at reference points and at interception points yields sufficient information for determining the angular misalignment. Accordingly, for each complete revolution of the disc, two sources of alignment information are provided by the photodetectors upon interception of the aperture by the line images.

According to one embodiment of the invention, the disc position during interception is measured by an encoder device connected to the rotating disc. The encoder is read out by appropriate logic circuitry upon the described interception. To result in alignment information, such readouts are compared with the encoder readouts corresponding to the reference positions of the disc, which numbers are known from initial encoder calibration.

In a modified embodiment, the disc is rotated at a constant angular speed. Timers are actuated at the instant the disc is rotated past its reference positions. The timers are stopped at the instant the photodetectors detect the described interceptions of the aperture by the line images. Thus, the time duration defined between reference position and intercept position of the rotating disc is directly proportional to angular misalignment. As will be explained hereinafter, positive or negative misalignment information is provided to correspond with clockwise or counterclockwise misalignment of the test body.

Accordingly, an object of the present invention is to provide apparatus for accurately detecting and measuring angular misalignment of a test body with respect to a reference body about the line of sight between the two bodies.

Another object of the invention is to provide apparatus for accurately detecting and measuring angular misalignment of a test body with respect to a reference body about the line of sight between the two bodies, even in the event of lateral displacements between the two bodies.

A further object of the invention is to provide apparatus for operably detecting roll misalignment of a body with respect to a reference body, for the purpose of correcting such misalignment.

Another object of the invention is to provide a rotating disc which turns on and subsequently turns off timers as a measure of angular misalignment of a test body with respect to a reference body.

Still another object of the invention is to provide a rotating disc containing an aperture, the angular displaced positions of which when intercepted by line images are indicative of angular misalignment of a test body.

Other objects and many attendant advantages of the present invention will become readily apparent upon perusal of the following detailed description thereof taken in conjunction with the drawings wherein:

FIG. 1 is a schematic representation of a fundamental embodiment of a roll alignment detector according to the invention together with a schematic representation of a test body under alignment detection;

FIG. 2 is a schematic representation of a modified embodiment of the detector apparatus illustrated in FIG. 1;

Figure 4:
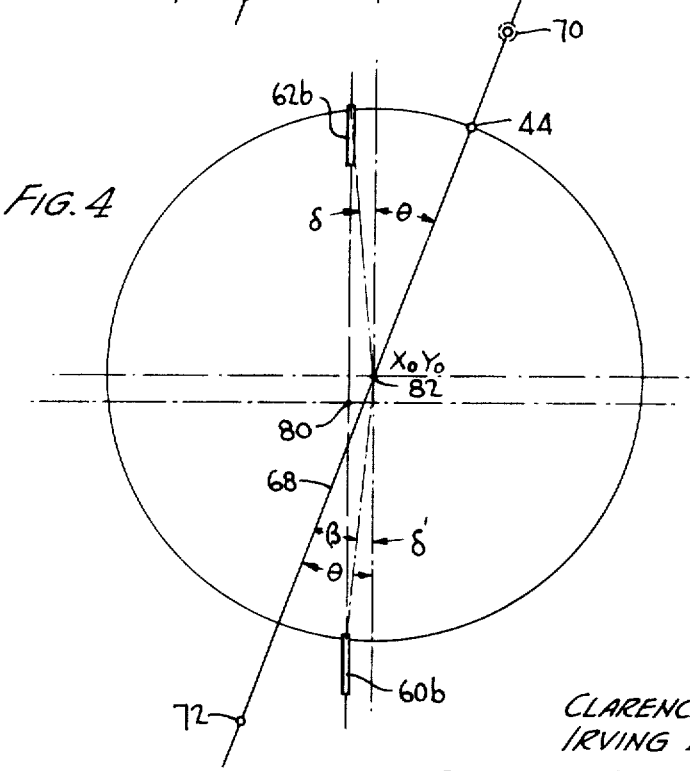
Figure 5:
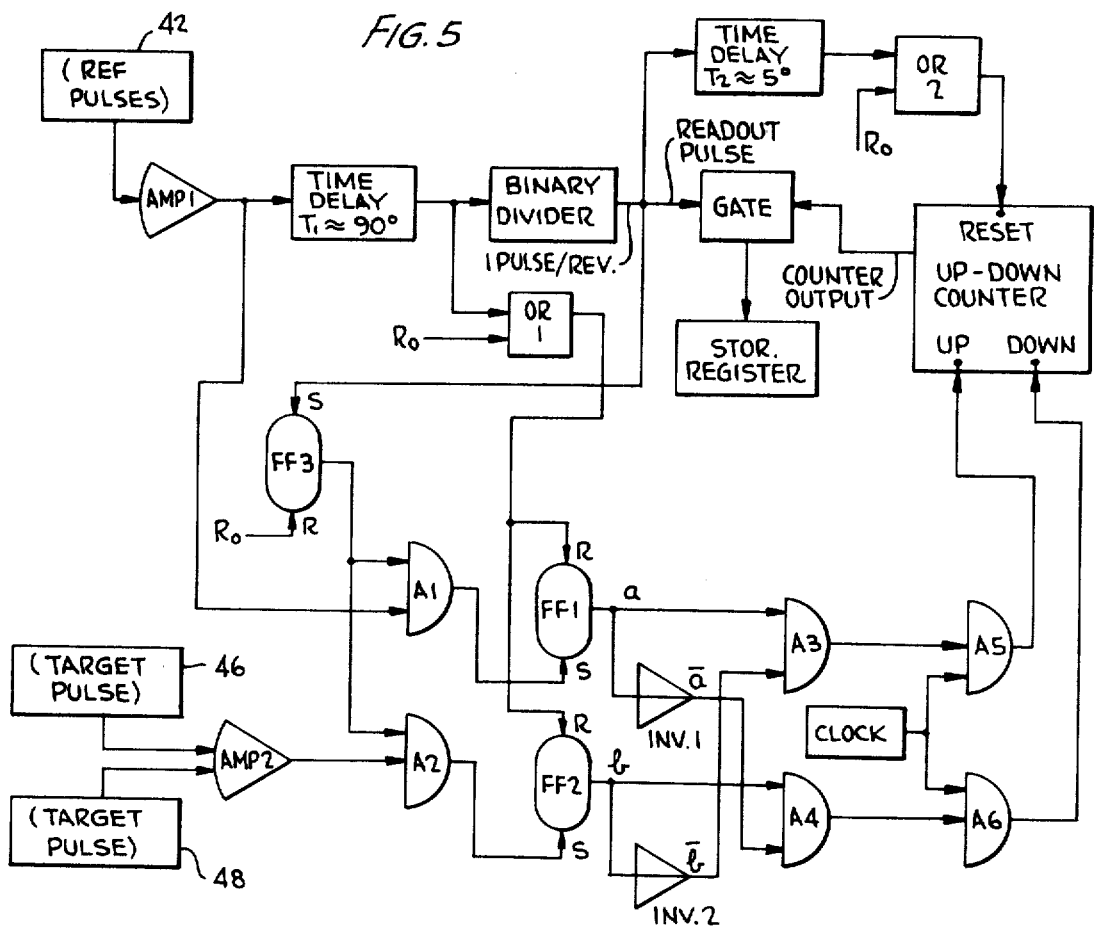
Figure 6:
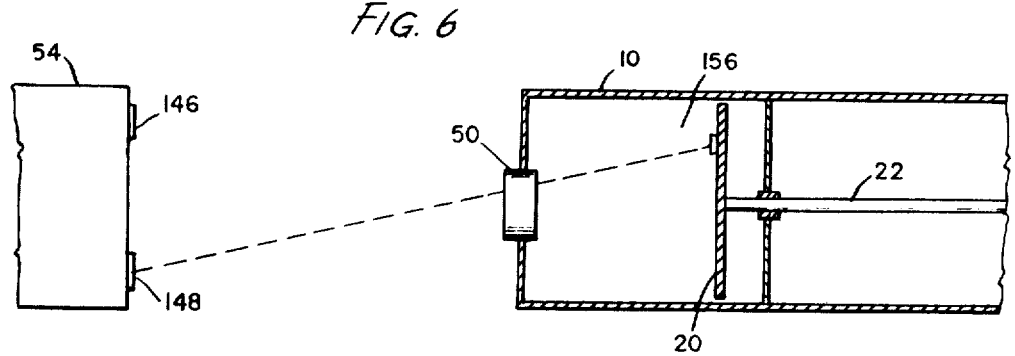

FIG. 4 is a diagrammatic representation of roll misalignment of a body, which body is additionally misaligned laterally with respect to the optical axis of the detector apparatus as illustrated in FIGS. 1 and 2; and FIG. 5 is a schematic of logic circuitry for use in conjunction with the detector apparatus of FIG. 1, which logic circuitry indicates positive and negative roll misalignment of the test body under alignment detection; and FIG. 6 is a schematic representation of another modified embodiment of a roll alignment detector illustrated in FIG. 1.

With more particular reference to FIG. 1 of the drawings there is illustrated generally at 10 a first fundamental embodiment of roll alignment detector apparatus according to the invention. The apparatus includes a generally elongated housing 12 having longitudinally spaced, laterally extending structural supports 14, 16 and 18. Adjacent to the support 14 is mounted a rotating disc 20, illustrated edgewise in the figure. Additionally, the disc 20 is disposed in relatively closely spaced proximity to the support 14. The disc 20 is provided centrally thereof with an elongated shaft 22 mounted for rotation on the supports 14 and 16. More particularly, the shaft 22 is mounted to the supports 14 and 16 by bearings 24 and 26, respectively. The terminal end 28 of the shaft 22 is operably connected to the drive shaft 30 of a constant speed motor 32 which is mounted generally centrally of the support 18.

With more particular reference to the disc 20, said disc comprises a first pinhole reference aperture 34 located adjacent to the circumferential outer periphery of the disc 20. A second aperture 36, similar to the aperture 34, is located equally adjacent to the outer circumferential periphery of the disc 20 and is specifically angularly spaced 180° from the aperture 34. The apertures 34 and 36 comprise relatively small geometry portions of the disc 20 that are optically transparent to a light beam. For example, a source of collimated light 38 is illustrated schematically adjacent to the aperture 34. The collimated light source 38 is fixed securely to the housing 12 and provides a collimated light beam 40 which illuminates the aperture 34. In practice, the aperture 34 permits passage of the light beam 40 therethrough in order to illuminate a first photodetector 42 mounted on the support 14 and in relatively close proximity to the disc 20. Upon rotation of the disc through an arc of 180°, the aperture 36 will be rotated so as to intercept the light beam 40, again permitting illumination of the first photodetector 42. Accordingly, the photodetector 42 is twice illuminated for each complete revolution of the disc 20. Upon each of such illuminations, the first photodetector 42 will provide a reference pulse output for a purpose to be hereinafter described in detail.

Again with reference to FIG. 1, the disc 20 is provided with a third pinhole aperture 44. The third aperture is located in relatively close space relationship with respect to the aperture 34 and is rectilinearly aligned with both the apertures 34 and 36. The aperture 44 is transparent to incident light and, in a manner to be hereinafter explained in detail, is adapted to intercept an imaged line of light. Said aperture 44 permits passage of part of the line image through the disc 20 for illumination of a second photodetector 46. Said photodetector 46 is mounted on the support 14 in spaced relationship with respect to the photodetector 42 and is in relatively close spaced proximity and in alignment with the pinhole aperture 44 in its position illustrated in FIG. 1. A third photodetector 48 is mounted on the support 14. Additionally, the third photodetector 48 is specifically positioned on the support 14 such that it will be in close spaced proximity to and in alignment with the third aperture 44 upon rotation of the disc 20 through an arc of 180°. Accordingly, as will be explained further in detail, the photodetectors 46 and 48 will be successively illuminated respectively by line images as the disc 20 is rotated to positions that align the third aperture 44 with each of said photodetectors.

To complete the detector apparatus 10, one end of the longitudinal housing 12 is provided with an optics housing 50. Typically contained within the optics housing 50 is an optical system 52 for receiving incident light beams 60a and 62a focusing the same upon the planar surface of the disc 20. The optics in conjunction with the housing geometry of the apparatus will preclude illumination of apertures 34 and 36 by the focused beams. Accordingly, the disc 20 is located at the focal plane of the optical system contained within the optical housing 50. For clarity, only a simple optical system will be shown and described in conjunction with FIG. 1 of the drawings. However, it should be understood that in actual practice, other, more complicated optical systems and configurations may be utilized that yield the same basic geometric relationships shown in FIG. 4. Accordingly, as shown in FIG. 1, the optical system illustrated comprises a single lens 52 adapted for focusing incident light rays upon the planar surface of the disc 20, which is located at the focal plane of the lens 52.

Shown in spaced relationship from the optical housing 50 is a satellite component, schematically illustrated as 54. This satellite component is to be mounted on the test body. For simplicity, the satellite component 54 is illustrated as a rectangular box. However, many suitable configurations therefor are utilized in actual practice. Internally of the satellite component 54 are located light sources 56 and 58. The light sources project beams 60 and 62, respectively.

The beams 60 and 62 are incident upon two hairline slits 64 and 66, respectively, carried by the satellite component 54. Light beams 60a and 62a emanate from slits 64 and 66, respectively. As viewed from the reference body 10, the arrangements in component 54 provide two illuminated rectilinear slits facing body 10. In the absence of angular rotations and lateral deflections, a line coincident with slits 64 and 66 will be parallel to a line bisecting detectors 42, 46 and 48. Further, the extended centerline of shaft 22 will be orthogonal to the line coincident with slits 64 and 66 and will exactly bisect said line.

The optical system 52 in body 10 gathers the light beams 60a and 62a emanating from slits 64 and 66 and focuses said beams upon the rotating disc 20. The disc 20 is so located as to lie in the focal plane of the optical system 52. In this manner, two sharp rectilinear line images are projected onto the face of the disc 20. Further, the line images are projected onto the disc 20 in such a manner that, during one complete revolution of the disc 20, aperture 44 will intercept each of the projected line images one time. More specifically, aperture 44 will intercept the projected line image of illuminated slit 66 when the portion of disc 20 containing aperture 44 is rotating through upper quadrants of housing 12. Upon interception of the imaged line by aperture 44, a part of the imaged line light energy will be transmitted through aperture 44 and will illuminate photodetector 46. In a similar fashion, when the aperture 44 on disc 20 is rotating through the lower quadrant of the housing 12, the projected image of illuminated slit 64 will be intercepted by aperture 44 thereby illuminating photodetector 48. Thus, it is readily seen that the light beams emanating from slits 64 and 66 located on component 54 are utilized by the optical system 52 to focus said light beams as line images upon the rotating disc 20 in body 10 in such a manner that angular rotations about the line of sight between the two bodies and lateral displacements orthogonal to the line of sight between the two bodies are accurately reflected by the position of the projected line images upon the face of the planar disc 20.

In operation, the detector housing 10 is mounted upon a reference body (not shown) secured to a spacecraft, also not shown, such that it is maintained in precise alignment with spacecraft reference axes. Alternately, the detector housing 10 itself may comprise the reference body. The satellite component 54 schematically represents another body which is aligned with the reference body. Though this alignment is initially accurate, due to structural instability in the mounting structure for component 54, the latter often becomes angularly misaligned about the line of sight to the reference body. The detector apparatus 10 thus is provided to detect and measure such angular misalignment, denoted as roll misalignment.

Figure 3:
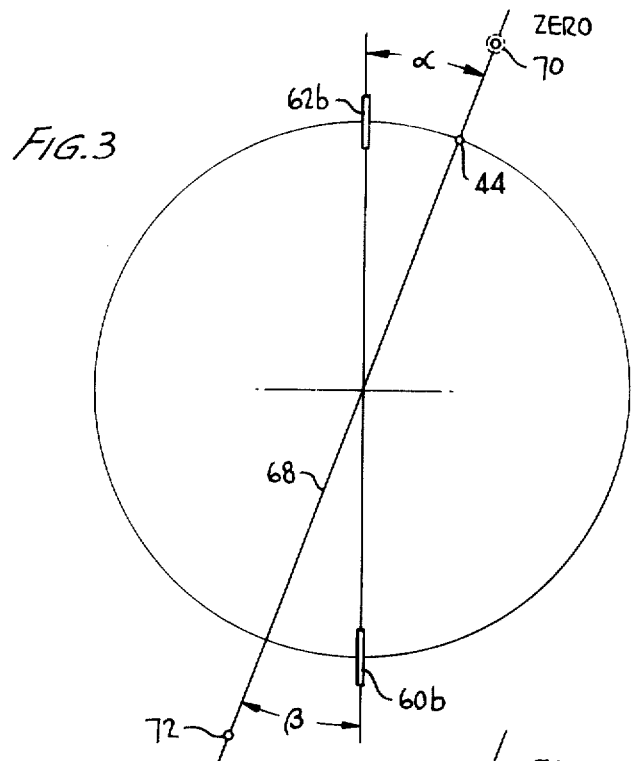
FIG. 3 is a diagrammatic representation illustrating positive roll misalignment of a body with respect to the reference position of the disc apparatus illustrated in FIGS. 1 and 2.

FIG. 3 illustrates the diagrammatic relationship when a roll misalignment exists between the test body 54 and the reference body 10 without any lateral displacement. With reference to the figure, the graph represents the operation of the detector 10.

More particularly, the reference axis 68 is shown with a zero reference point 70 corresponding to the instant that the first photodetector 42 is illuminated as the disc 20 is rotated by the constant speed motor 32 to the position enabling the aperture 34 to intercept the reference light beam 40. The location of the focused line image 62b of the light beam 62a upon the surface of the disc 20 is angularly displaced from the reference point 70 by an angle α (alpha) which in this example is equal to the roll misalignment θ (theta). The output pulse from the photodetector 42 activates a counter for measuring the time duration until, upon further rotation of the disc 20, the aperture 44 is rotated through the angle α and intercepts the line image 62b of the collimated light beam 62a. Upon such interception, the second photodetector 46 will be illuminated, thereby creating an output therefrom which stops the counter. The difference in time measured by the counter is proportional to the angle α (alpha).

In FIG. 1, rotation of the disc 20 continues until the aperture 36 is rotated through an arc of 180° with respect to the reference point 70 in FIG. 3. By such rotation the aperture 36 intercepts the reference light beam 40 whereby the photodetector 42 is again illuminated. The output pulse from the detector 42 again activates a counter. In FIG. 3, the reference axis 68 is shown with a second reference point 72 which is located 180° with respect to the zero reference point 70. Accordingly, the 180° space reference points 70 and 72 correspond to the two interceptions of the reference light beam 40 as the disc rotated through an arc of 180°.

Upon further rotation of the disc, the disc will be rotated through an angle at which the aperture 44 will intercept a line image 60b formed by the light beam 60a. This angle is designated as $\beta$ (beta) which again is equal to the roll misalignment $\theta$ for this example. Such interception causes illumination of the third photodetector 48, the output pulse from which, stops the counter. The difference in time measured by the counter is proportional to the angle $\beta$ between the light source image 60b and the second reference point 72. Accordingly, for each complete revolution of the disc two time intervals proportional to $\alpha$ and $\beta$ are measured by the counter. The time intervals are then averaged, such average thus indicates the roll misalignment $\theta$ of the body 54 with respect to the line of sight of the reference body 10, i.e.:

$$\theta = \tfrac{1}{2}(\alpha + \beta)$$

Accordingly, a signal representative of the average value of the time intervals is either telemetered to an operator or supplied to control apparatus not shown for imparting roll displacement of the body 54 until the average value of the angles $\alpha$ and $\beta$ are reduced to zero, i.e.:

$$\theta = \tfrac{1}{2}(\alpha + \beta) = 0$$

With reference to FIG. 4, it will be shown that operation of the device provides accurate measurement of the roll misalignment of the component 54 even with the presence of lateral displacement thereof. Accordingly, the axis center 80 represents the alignment of the component 54, which alignment is laterally displaced with respect to the longitudinal axis 82 of the disc 20. Accordingly, as shown in the graph, the component 54 is both roll misaligned by the angle $\theta$ and laterally misaligned by distances $X_o$ and $Y_o$ as shown by the position of the axis center 80. With respect to the graph then, the following relationships are apparent:

1. $\alpha = \theta + \delta$
2. $\delta = \sin^{-1} X_o/r$
3. $\beta = \theta - \delta'$
4. $\delta' = \sin^{-1} X_o/r$
5. $\delta' = \delta$
6. $\beta = \theta - \delta$
7. $\theta = \dfrac{\alpha + \beta}{2} = \dfrac{\theta + \delta + \theta - \delta}{2} = \theta$ Thus, the simple measurement of two time intervals provides accurate measurement of roll misalignment of the component 54 even in the presence of a lateral displacement thereof.

With reference to FIG. 5, logic circuitry is shown for automatically measuring the roll misalignment of the body 54.

When the detector 10 is first turned on, a reset pulse $R_o$ will be generated to reset a flip-flop FF or OR-gates 1 and 2. Thereafter the system is quiescent until a pulse is generated at the output of a binary divider, this occurring at approximately 90° after two reference pulses are generated by the photodetector 42. This binary divider output causes the output of the Up-Down counter (which will be zero initially) to be fed to a storage register. This pulse also sets FF3 to the ON state thus arming AND-gates A1 and A2.

When the next reference or light image target pulse occurs, it will pass through an appropriate AND-gate (A1 or A2) to set a corresponding flip-flop (FF1 or FF2) to the ON state. If the reference pulse occurred first, it will be FF1 that is turned on. The output of FF1 (signal $a$) is fed to an AND-gate A3 together with the inverse of FF2 (signal $b$). Also AND-gate A3 will be satisfied so that a signal passes therethrough to an AND-gate A5 permitting a clock to provide signals to go to the UP side of the Up-Down counter. It should be noticed that AND-gate A4 is blocked since signals $b$ and $a$ are zero for FF1 and FF2 off. When the light image signal appears (normally within 10° of the reference signal), FF2 will be turned on which will cause AND-gate A3 to be blocked and thus cause the counter to stop counting up. AND-gate A4 remains blocked due to the absence of signal $\bar{a}$.

Approximately 90° after this pair of signals (reference pulse followed by a light image target pulse), a pulse will be generated at the output of the 90° time delay which will simultaneously reset FF1 and FF2 to zero. AND-gates A3 and A4 will remain blocked. This gets FF1 and FF2 ready for the next pair of signals. If the next pair of signals is a reference pulse followed by a light image target pulse, the Up-Down counter will count up from the previous number in the counter. If the target pulse occurs first, the counter will count down from the previous number, as can be seen from the symmetry of the system logic.

Approximately 90° after this second pair of signals, a pulse will be generated at the output of a binary divider. This will cause the output of the counter, which is proportional to the angle $(\alpha + \beta)$, to be fed to the storage register. This proportionality constant can easily be made equal to one-half, by selection of clock frequency, so that the number transferred to the storage register will be the detected roll angle $$\theta = \tfrac{1}{2}(\alpha + \beta).$$

A plus (+) or minus (−) sign will accompany the number to indicate CW or CCW polarity of roll angle $\theta$.

Note that it is immaterial whether the first pair of signals produced a count corresponding to the angle $\alpha$ or the angle $\beta$. The next pair of signals will correspond to the opposite angle so that the sum will always be the same, i.e., $\tfrac{1}{2}(\alpha + \beta)$.

From the time of the first output pulse from the binary divider, the sequence of operations occurs during one revolution thereof so that an updated measurement of roll angle $\theta$ is available at the storage register once per revolution.

With reference to FIG. 2, a modified form of the detector 10 will be described. Accordingly, there is shown in the figure generally at 74, a housing 76 having therein at least one lateral support. A modified rotating disc 20a is provided with a single aperture 44a corresponding to the aperture 44 of the disc 20 of the device 10. The modified disc 20a is rotatably mounted on a central shaft 22a which is connected to a shaft encoder 78. The shaft 22a is additionally operably connected to a drive motor 32a not necessarily of constant speed. The elongated housing 76 is provided additionally with an optic housing 50a at one end thereof, corresponding to the optic housing 50 of the body 10. By substitution of the modified device 74, the light beams 60a and 62a are focused by the optics contained within the housing 50a upon the planar surface of the disc 20a. Illumination of the photodetectors 46a and 48a occur when upon rotation of the disc 20a by the drive motor 32a the aperture 44a intercepts the line images of said light beams. Turning of the disc 20a continually activates the shaft encoder which is caused to produce a readout upon receipt thereof of outputs from the photodetectors 46a and 48a. Appropriate logic circuitry, not shown, then compares these encoder readouts with encoder readouts corresponding to the zero and 180° reference positions of the disc 20a which are known from initial encoder calibration. Accordingly, by such comparison of encoder readouts, which corresponds to measurements of the angles $\alpha$ (alpha) and $\beta$ (beta), the roll misalignment of the component 54 is detected and measured. It is noted that the detector 74 will accurately measure roll misalignment with the presence of some lateral misalignment of the body 54, in similar fashion as described in conjunction with FIGS. 1 and 4.

Although preferred embodiments of the present invention have been described in detail, other embodiments and modifications thereof are possible. An alternate embodiment, shown in FIG. 6 yields the exact same detection geometry that is shown in FIGS. 3 and 4, consists of mounting a collimated light source 156 of small diameter on the rotating disc at the same location as the aperture in the fundamental design. The light sources on the test body are replaced by photodetectors 146 and 148 in the same geometric arrangement. The rotation of the disc causes the collimated beam of light to image as a moving spot of light on the test body, such image motion being circular in nature and centered about the optical axis of the reference body. Thus the moving spot of light will intercept the detectors on the test body. In this manner the detection function of the photodetectors 46 and 48 shown in FIG. 1 is transferred to the detectors 146 and 148 mounted on the test body 54. In this embodiment the logic circuitry shown in FIG. 5 can be used. Also the shaft encoder configuration shown in FIG. 2 can be used.

The preferred embodiments are shown in schematic configurations to permit wide range adaptations thereof in practice of the concepts embodied by the present invention. Accordingly, the scope and spirit of the present invention should be interpreted broadly and limited only by the recitation in the appended claims, wherein:

What is claimed is:

1. A method of detecting angular misalignment of a test body with respect to a reference body about the line of sight between the two bodies, including the steps of: providing a reference body with at least one collimated light source mounted off center on a disc, projecting a light beam from said source so as to image a spot of light on said test body, rotating said disc from a reference position until said light beam intercepts a detector on said test body, detecting the angular displacement of said disc, and comparing the displacement of said disc upon interception of said detector by said light beam with the reference position of said disc, said compared angular displacement being indicative of angular misalignment of said body with respect to a reference body about the line of sight between the two bodies.

2. The method of claim 1 and further including the step of: encoding the angular displacement of said disc throughout a complete revolution thereof.

3. The method of claim 1, wherein rotation of said disc is accomplished at constant angular speed.

4. The method of claim 3, wherein said detecting and comparing steps are combined in the additional step of measuring the time duration elapsed when said disc is rotated from its reference position to a position at which said light beam intercepts said detector on said test body, whereby said time duration is directly proportional to the angular misalignment of said body with respect to the reference body about the line of sight between the two bodies.

5. Apparatus for detecting roll misalignment of a body with respect to a reference body about the line of sight between the two bodies, comprising: a housing, a disc mounted for rotation in said housing, said disc mounted off center of said line of sight, a collimated light source, drive means for rotating said disc and light source and being so constructed and arranged so as to project a moving light beam on the body under test, detectors on the body under test to intercept said moving light beam upon rotating of said disc from a reference position, means for detecting the angular position of said disc when such interception occurs, said angular displacement being indicative of angular misalignment of said body with respect to the reference body about the line of sight between the two bodies.

6. The structure as recited in claim 5, wherein said disc is connected by a rotatable shaft to said drive means and a shaft encoder is provided on said shaft.

7. The structure as recited in claim 5, wherein said drive means comprises a constant speed motor, whereby said disc is rotated at a constant angular speed, and further including a timer for measuring the time elapsed when said disc is displaced from its reference position to a position whereby interception by a detector of the moving light beam occurs, said time duration being proportional to the angular displacement of said disc.

8. The structure of claim 7, and further including: a fixed light beam source in said housing adapted to be intercepted by said disc upon rotation thereof, first photodetector in the housing and second photodetector on the test body operably connected to said timer, one of said photodetectors starting said timer upon interception of the fixed light beam by an aperture in said disc, and the other of photodetectors stopping said timer upon interception of said moving light beam.

9. The structure as recited in claim 6, wherein said disc has mounted thereon at least one collimated light source, a photodetector mounted in said test body and operably connected to said encoder in order to provide a readout thereof when said photodetector is intercepted by said light beam.

10. Apparatus for detecting roll misalignment of a body with respect to a reference body about the line of sight between the two bodies, comprising; a housing, a disc mounted for rotation in said housing, said disc being so constructed and arranged so as to intercept with an aperture a light image projected thereon by the body under test upon rotating of said disc from a reference position, drive means for rotating said disc including a constant speed motor and a rotatable shaft coupling said disc and motor, a shaft encoder on said shaft, a timer for measuring the elapsed time when said disc is displaced from its reference position to a position whereby interception by an aperture of the line image occurs, said time duration being proportional to the angular displacement of said disc, said angular displacement being indicative of the angular misalignment of said body with respect to the reference body about the line of sight between the two bodies and further including a fixed light beam source in said housing adapted to be intercepted by said disc upon rotation thereof, first and second photodetector means operably connected to said timer, said first photodetector starting said timer upon interception of the fixed light beam by an aperture on said disc, said second photodetector stopping said timer upon interception of said light image, or said second photodetector starting said timer and said first photodetector stopping said timer.

11. The structure as recited in claim 10 wherein said disc includes at least two radially aligned apertures therethrough, said first photodetector being illuminated by said fixed light beam transmitted through one of said apertures, and the second photodetector being illuminated by said light image transmitted through the other of said apertures.

12. The same as claim 11 except for eliminating the reference to claim 10 therein and replacement with a reference to claim 8.

* * * * *